(12) United States Patent
Torvinen

(10) Patent No.: US 6,643,561 B1
(45) Date of Patent: Nov. 4, 2003

(54) PARAMETRIC PROGRAMMING OF LASER CUTTING SYSTEM

(75) Inventor: Jukka M. Torvinen, Raleigh, NC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 09/476,162

(22) Filed: Dec. 30, 1999

(51) Int. Cl.[7] .............................................. G06F 19/00
(52) U.S. Cl. ........................ 700/166; 700/145; 700/182; 703/1
(58) Field of Search ........................... 700/181, 86, 87, 700/166, 164–165, 145, 206, 103, 178, 182; 716/20; 703/1; 345/419, 420; 219/121.64

(56) References Cited

U.S. PATENT DOCUMENTS

| | | | |
|---|---|---|---|
| 5,037,172 A | 8/1991 | Hekman et al. .............. 385/31 |
| 5,262,612 A | * 11/1993 | Momany et al. ........ 219/121.67 |
| 5,471,395 A | 11/1995 | Brien ......................... 700/166 |
| 5,508,490 A | 4/1996 | Klose .................... 219/121.62 |
| 5,604,677 A | 2/1997 | Brien ......................... 700/166 |
| 5,681,490 A | 10/1997 | Chang .................... 219/121.64 |
| 5,703,782 A | 12/1997 | Dundorf ..................... 700/166 |
| 5,793,015 A | 8/1998 | Walczyk ................ 219/121.67 |
| 5,835,374 A | 11/1998 | Nakamura .................... 700/87 |
| 5,864,482 A | 1/1999 | Hazama et al. ............... 700/95 |
| 5,994,867 A | * 5/1999 | Herke ..................... 219/121.6 |
| 5,910,261 A | * 6/1999 | Mori et al. .............. 219/121.7 |
| 6,058,839 A | * 5/2000 | Frazzitta .................. 101/382.1 |

OTHER PUBLICATIONS

Website address: http://www.cncci.com/tips/parprg.htm Website maintained by CNC Concepts, Inc.
Website address: http://www.programminggunlimited.com/product.htm This cite references a manual entitled *The CNC Macro Language—An Introduction Parametric Programming*.

* cited by examiner

Primary Examiner—Albert W. Paladini
Assistant Examiner—Kidest Bahta
(74) Attorney, Agent, or Firm—Woodcock Washburn LLP

(57) ABSTRACT

The present invention is part of a system and method for creating products of varying characteristics on an automated production line. The system includes one or more production line devices, for example robots and machines. Specifically, the present invention provides a system and method for automating a laser cutting device. The method comprises receiving a data file to the laser cutting device, converting the data file to an instruction file, and operating the laser cutting device with the instruction file. The instruction file may be a computer numeric control computer program, for example. The data file includes characteristics to be created on a workpiece by the laser cutting device. In one embodiment, the method may further comprise programming the laser cutting device with a parametric computer program, such that the parametric computer program receives the data file. In another embodiment, the method may further comprise automatically connecting a power source to the laser cutting device, when the laser cutting device receives the data file.

17 Claims, 6 Drawing Sheets

| Part No. | Name | X1 | Y1 | X2 | Y2 | Bend | Translate |
|---|---|---|---|---|---|---|---|
| 2A16124F01 | Switch Hole | 19.00 | 4.57 | | | ☐ | ☐ |
| 2A16023F01 | Oil Fill Hole | 16.90 | 16.90 | 6.82 | 24.74 | ☐ | ☐ |
| 4857A75H01 | Oil Fill Pad | 16.90 | 16.90 | 6.82 | 24.74 | ☐ | ☑ |
| 2A16099F01 | Bends | 0 | 17.32 | 0 | 51.51 | ☑ | ☐ |
| ... | | | | | | | |

| Part No. | Machine | Tool/Feeder |
|---|---|---|
| 2A16124F01 | M04 | T05 |
| 2A16023F01 | M04 | T03 |
| 4857A75H01 | M07 | T02 |
| 2A16099F01 | M05 | T243 |
| 2A16099F02 | M05 | T244 |

*FIG. 4A*

| MDF | Comments |
|---|---|
| M04, T03 | 'Machine/Tool Definition |
| 16.90, 6.82 | 'X, Y location of Hole #1 |
| 16.90, 24.74 | 'X, Y location of Hole #2 |
| | |
| M04, T05 | 'Machine/Tool Definition |
| 19.00, 4.57 | 'X, Y location of tool 'hit' |
| | |
| M05, T243 | 'Machine/Bend Program |
| 0, 17.32 | 'Bend #1 location |
| 0, 51.51 | 'Bend #2 location |
| | |
| M07, T02 | 'Machine/Feeder Definition |
| 16.90, 6.82 | 'Fitting #1 location |
| 16.90, 24.74 | 'Fitting #2 location |
| ... | |

| | |
|---|---|
| M03T11<br>33.090, 0.000 | ## ???????? FPCorner radius bot |
| M04, T01<br>58.480, 24.500<br>64.480, 24.500 | ## 2A16101F01, BWTrim, 12x32x24.04, Stl D |
| M04, T01<br>0.000, 24.500 | |
| M04, T02<br>13.320, 23.950<br>45.150, 23.950 | ## 2A16102F01, BWNotch, 12x32x24 Tank |
| M04, T04<br>56.490, 23.950 | ## 2A16119F01, BWrapCNotch, 12x32x24.04 |
| M04, T05<br>1.990, 23.950 | ## 2A16119F02, BWrapCNotch, 12x32x24.04 |
| M07, T205<br>21.070, 0.000 | ## 2A16121F01, FPanSqBends, 12x32x24x5 |
| M08, T201<br>1.930, 0.000 | ## 2A16104F01, FPanel HemBend 2A16104F01 |
| M09, T01<br>0.000, 23.950<br>13.320, 0.000<br>45.150, 0.000 | ## 2A16099F01, BWSqBends, 12x32x24 Tank |
| M15, T01<br>3.933, 4.000<br>12.723, 11.850 | ## 2A16028F01, HVBushing Hole − 2.53 Dia** |
| M16, T01<br>−18.127, 18.410 | ## 72A4475H01, CC Dimple Ref 2A16112F01** |
| M17, T01<br>4.000, 19.950 | ## 2A16139F01, Left Lift Lug, 12x32x24.04 |
| M17, T02<br>8.000, 19.950 | ## 2A16139F02, Right Lift Lug, 12x32x24.0 |
| M18, T05<br>0.473, 24.000 | ## 01D5950H07, Grd Pads −Ref: 2A16078F01** |
| M18, T05<br>0.473, 21.500 | ## 01D5950H07, Grd Pads −Ref: 2A16078F01** |
| M18, T01<br>0.343, 19.900 | ## 4857A75H01, Oil Pads −Ref: 2A16023F01** |
| M18, T05<br>0.473, 8.000 | ## 01D5950H07, Grd Pads −Ref: 2A16078F01** |
| M18, T03<br>16.513, 22.900 | ## 2890A90H02, PRD Pad −Ref: 2A16024F01** |
| M18, T01<br>14.263, 17.900 | ## 4857A75H01, Oil Pads −Ref 2A16023F01** |
| M19, T01<br>12.513, 24.500<br>7.513, 26.500<br>2.513, 28.500 | ## 72A4443G01, LV Studs− Ref 2A16022F01** |
| M19, T02<br>3.933, 4.000<br>12.723, 11.850 | ## 72A4444G01, HV Studs − Ref 2A16028F01** |
| M20, T01<br>16.910, 0.000 | ## 2A16008H01, Back Boltin − Ref 2A16120 |

| | |
|---|---|
| M01, T01 | ## Overall nominal tank dimensions – depth, width, height, BaseHt |
| 12.00, 32.00, 24.04, 5.17, "C" | |
| M02, T01 | ## W3H31VA40S, Stl Blank, 31.79x40.58 |
| 40.583, 31.790 | |
| M02, T02 | ## W3H245A66U, Stl Blank, 24.50x66.97 |
| 66.970, 24.500 | |
| M03, T01 | ## 2A16105F01, FPtrim for 12x32x24.04 Ta |
| 33.090, 31.790 | |
| 39.090, 31.790 | |
| M03, T01 | |
| 0.000, 31.790 | |
| M03, T04 | ## 2A16022F01, LV Bushing Holes |
| 8.570, 24.500 | |
| 13.570, 26.500 | |
| 18.570, 28.500 | |
| M03, T06 | ## 2A16024F01, PR Device Hole .25 Dia |
| 4.570, 22.900 | |
| M03, T07 | ## 2A16023F01, Oil Fill/Dm Hole .50 Dia |
| 6.820, 17.900 | |
| 20.740, 19.900 | |
| M03, T09 | ## 2A16125F01, Bottom Brace Layout |
| 25.750, 15.900 | |
| 36.750, 15.900 | |
| M03, T09 | ## 2A16122F01, NP Stud Layout |
| 5.500, 27.290 | |
| 5.500, 30.540 | |
| M03, T09 | ## 2A16123F01, ParkStand Layout |
| 14.830, 7.930 | |
| 12.750, 10.000 | |
| M03, T09 | ## 2A16124F01, Latch Arm Layout |
| 7.660, 14.930 | |
| 7.660, 16.870 | |
| M03T10 | ## ???????? FPCorner radius top |
| 33.090, 31.790 | |

*FIG. 5B*

PARAMETRIC PROGRAMMING OF LASER CUTTING SYSTEM

CROSS-REFERENCE TO RELATED APPLICATION

The subject matter disclosed herein is related to the subject matter disclosed in copending application Ser. No. 09/476,966 (Attorney Docket Number ABDT-0364/B990590), filed on Dec. 30, 1999.

FIELD OF THE INVENTION

The present invention relates to the field of automated laser cutting devices. More specifically, the present invention relates to parametrically programming laser cutting devices.

BACKGROUND OF THE INVENTION

Over the past thirty years, machine automation has become an important aspect of every product's assembly or manufacturing line. Computer numerical control (CNC) machines are one type of common automated machinery. CNC machines can be directed by a computer program to perform any task that an operator could make a conventional machine perform, including welding, drilling, laser cutting, and bending. For example, a drill press operator who needs to drill three holes in a metal sheet no longer has to bring the press toward the sheet. Instead, the operator simply places the sheet on the drill press and a computer program commands the press to drill holes in the correct locations.

Until recently, CNC machines required individual programs for each specific task. For example, two distinct programs were needed in order to command a drill press to drill four holes in the middle of one metal sheet and four holes along the perimeter of another metal sheet. Therefore, an operator was required to place the first metal sheet in the press, load the first program, remove the first metal sheet, place the second metal sheet in the press, and load the second program. Thus, while CNC automated a machine's individual functionality, it did not automate multiple independent tasks. As a result, programmers consistently had to edit one CNC program to make another, no matter how closely related the tasks.

The advent of robotic manufacturing and assembly lines automated this process to a greater extent by eliminating manual movement of the workpiece. Specifically, using the above example, robots are now able to place the first metal sheet in the press, remove the first metal sheet when the CNC-controlled machinery has accomplished its task, place the second metal sheet in the press, and so on. However, the CNC-controlled machinery still requires discrete programs to perform different tasks. Therefore, although a manufacturing line may be automated robotically such that human intervention is not required to manipulate a workpiece in a certain way, human intervention (in the form of additional programming) still is required to permit the robotically-controlled line to manipulate the workpiece in a different way.

Parametric programming has been developed to overcome the need for discrete programs for each independent task that a machine performs. Parametric programming is a technique that allows a CNC programmer to vary the parameters of the task within one program, instead of writing an entirely new program each time the parameters are varied. In other words, parametric programming allows programs to be written using variable-designated parameters instead of fixed numbers. These variables can be changed each time the program is called. For example, if a parametric program is stored in a machine's memory to drill a bolt hole, the program can be used with any corresponding data file to drill any size hole in any location. Parametric programming also includes structures for conditional and unconditional program branching, repetitive looping and mathematical equations. There are several parametric programming languages including CUSTOM MACRO B™, USER TASK™, Q ROUTINE™ and ADVANCED PROGRAMMING LANGUAGE™. As a result, a programmer simply may develop one program for a certain machine, for example a drill press. The parametric program queues the operator to put in data sets for each individual task that the drill press must perform. The operator then tells the machine when to begin each task, instead of loading a new program each time. Therefore, programming efforts are reduced significantly.

Although parametric programming of individual robotic devices and machines is possible, there is no current method for incorporating the flexibility of parametric programming into an entire robotically-controlled manufacturing or assembly line. Because there is no current method for incorporating parametric programming into an entire robotic line, the benefits of parametric programming have not been realized in this application. Thus, complicated and complete programming revisions are necessary in order to vary the tasks of robotic lines. As a result, today's robotic manufacturing and assembly lines often are dedicated to manufacturing one type or size of a product. For example, in the context of electrical transformer tanks, a robotic manufacturing line can manufacture only one size enclosure with a particular set of characteristics (e.g., high voltage bushing locations). If another enclosure size with a different set of characteristics is desired, the line must be shut down and reprogrammed. Because of the consequent labor-intensive effort to make such a change, today's robotically-controlled manufacturing and assembly lines are dedicated to specific products or functions.

Therefore, it would be advantageous to use the flexibility of parametric programming techniques in a robotic assembly or manufacturing line such that products of varying size and character can be manufactured without interruption in the line. By minimizing human intervention in the production process, the present invention facilitates a "lights out" factory for the production of distribution transformers. Specifically, an external user, like a customer or a field sales person, may orchestrate the entire production process to meet his or her requirements via the Internet, for example. The user is able to configure the product and produce an online price quotation. Also, the user is able to submit orders, review scheduling, and receive confirmation of the manufacture of the products in a manner similar to ordering a custom made personal computer over the Internet. Additional detail for the "lights out" factory is found in International Application No.: PCTJUS00/35268, International Filing Date: Dec. 27, 2000; Attorney Docket No.: ABDT-0387.

SUMMARY OF THE INVENTION

The present invention provides a system and method for automating a laser cutting device. The method comprises receiving a data file to the laser cutting device, converting the data file to an instruction file, and operating the laser cutting device with the instruction file. The instruction file may be a computer numeric control computer program, for example. The data file includes characteristics to be created on a workpiece by the laser cutting device. In one embodiment, the method may further comprise programming the laser cutting device with a parametric computer program, such that the parametric computer program receives the data file. In another embodiment, the method may further comprise automatically connecting a power source to the laser cutting device, when the laser cutting device receives the data file.

BRIEF DESCRIPTION OF THE DRAWINGS

FIG. 4A is a table indicating the machines and tools needed to perform a desired task, according to the present invention;

FIG. 4B is an example of a MDF, according to the present invention; and

FIGS. 5A and 5B are an exemplary MDF for use with the present invention for the manufacture of an electrical transformer tank.

Reference will now be made in detail to a presently preferred embodiment of the invention, an example of which is illustrated in the accompanying drawings.

DETAILED DESCRIPTION OF PREFERRED EMBODIMENTS

By using parametric programming for an entire robotic production line, the present invention permits the robotic line to produce similar products of different characteristics without interruption in the line. For example, the present invention may allow a robotic manufacturing line to manufacture similar electrical transformer enclosures of varying sizes and various configurations.

Figure 1:
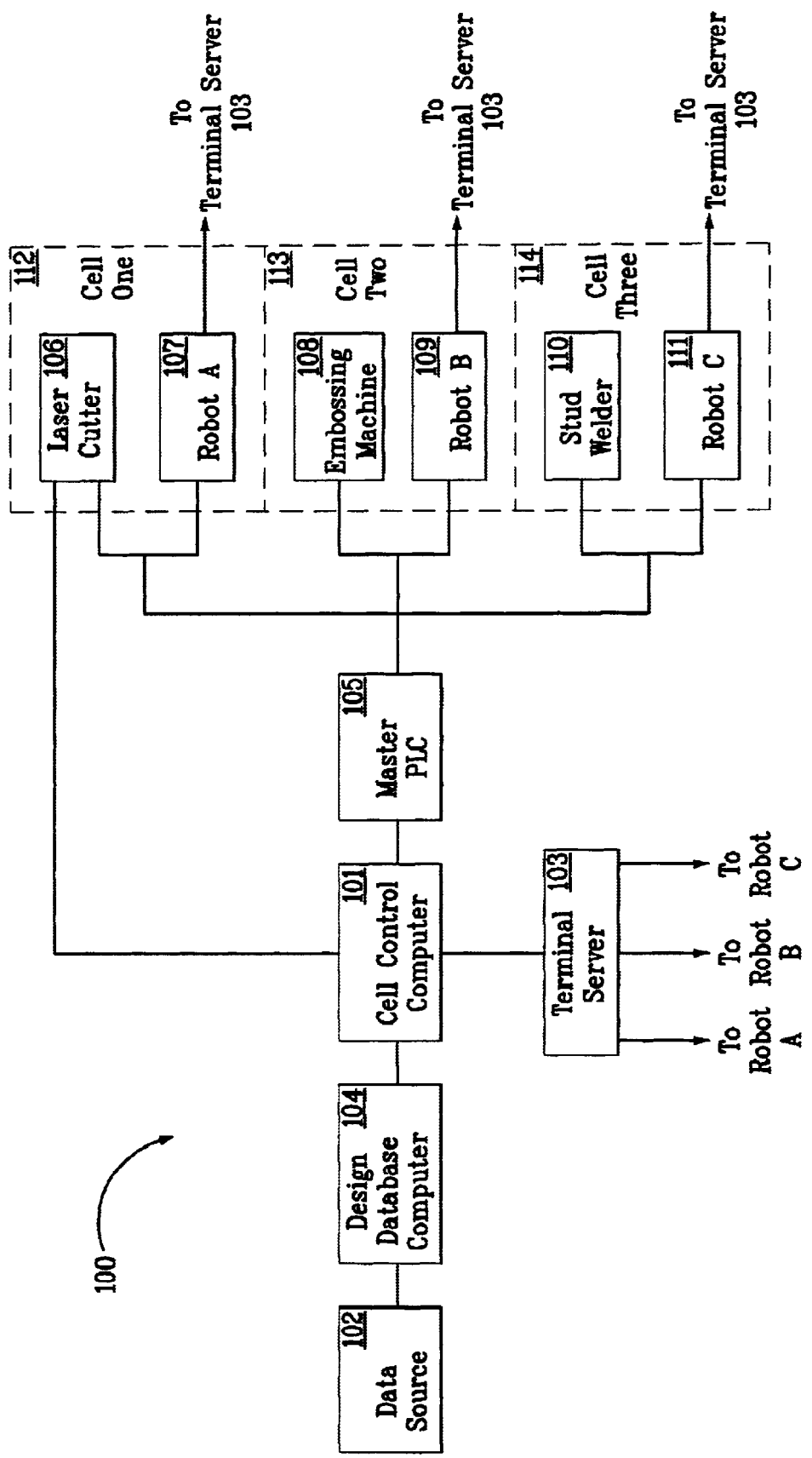
FIG. 1 is a block diagram of a robotically-automated electrical transformer tank manufacturing line, according to the present invention.

FIG. 1 is a block diagram of a robotically-automated electrical transformer tank manufacturing line 100, according to the present invention. As shown in FIG. 1, a data source 102 is coupled to a design database computer 104. Data source 102 may be a data entry terminal, for example, local to manufacturing line 100. Alternatively, data source 102 may be a remote terminal coupled to design database computer 104 via the Internet. Although one data source is shown in FIG. 1, it should be appreciated that there may be more than one data source. Design database computer 104 is coupled to cell control computer 101. Design database computer 104 may be connected to cell control computer 101 and data source 102 using local access network (LAN) technology, for example an Ethernet system operating on TCP/IP protocol. Although FIG. 1 shows design database computer 104 separate from cell control computer 101, design database computer 104 may be a software component of cell control computer 101.

Cell control computer 101 is coupled to terminal server 103, laser cutter 106, and master programmable logic controller (PLC) 105. Cell control computer 101 may be connected to master PLC 105 and terminal server 103 using LAN technology, for example an Ethernet system operating on TCP/IP protocol. Terminal server 103 is coupled to robot A 106, robot B 107, and robot C 111. Master PLC 105 is coupled to the devices in cell one 112, cell two 113, and cell three 114. Cell one 112 houses laser cutter 106 and robot A 107. Cell two houses embossing machine 108 and robot B 109. Cell three houses robot C 111 and stud welder 110. Although not shown, it should be appreciated that manufacture of the electrical transformer tank may include additional cells housing additional robots and machines. In this application the term "robot" refers a material moving device, and "machine" refers to a device that operates on and manipulates a workpiece. The terminology is consistent with that which is used in the art.

Figure 2:
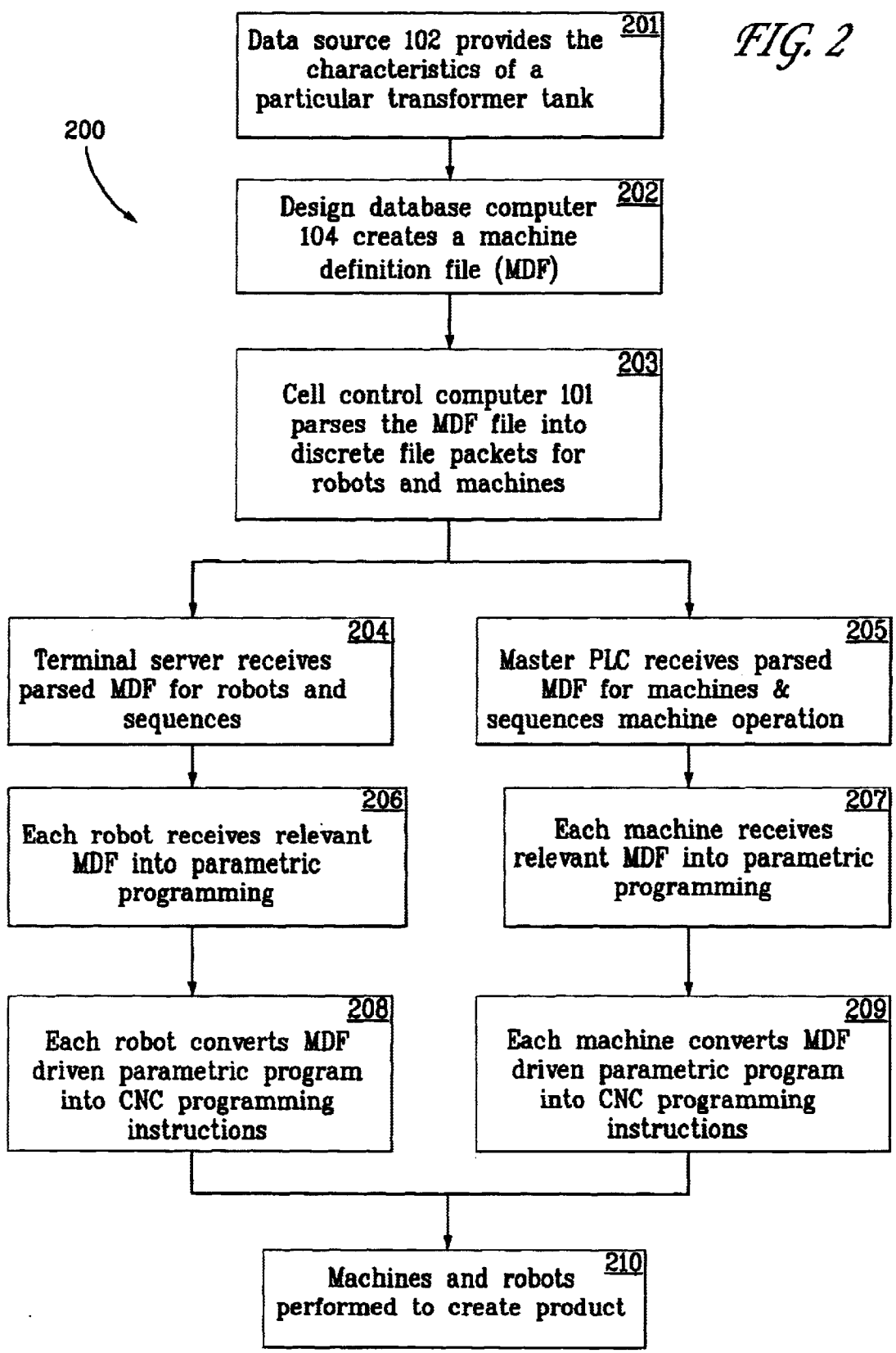
FIG. 2 is a flowchart detailing the operation of the robotically-automated electrical transformer tank manufacturing line, according to the present invention.

FIG. 2 is a flowchart detailing a method of operating the robotically-automated electrical transformer tank manufacturing line 200, according to the present invention. In step 201, data source 102 provides the desired characteristics of a particular electrical transformer tank. The characteristics from data source 102 may be provided by a customer who is remote from the manufacturing line using an Internet connection, for example. Alternatively, the tank's characteristics may be entered by an operator who is queried at a data entry terminal local to the manufacturing line. The customer may specify the characteristics of the electrical transformer tank either by choosing a standard tank model number. Alternatively, the customer may specify a list of individual features by name or by part number with corresponding location designations.

Figures 3A, 3B:
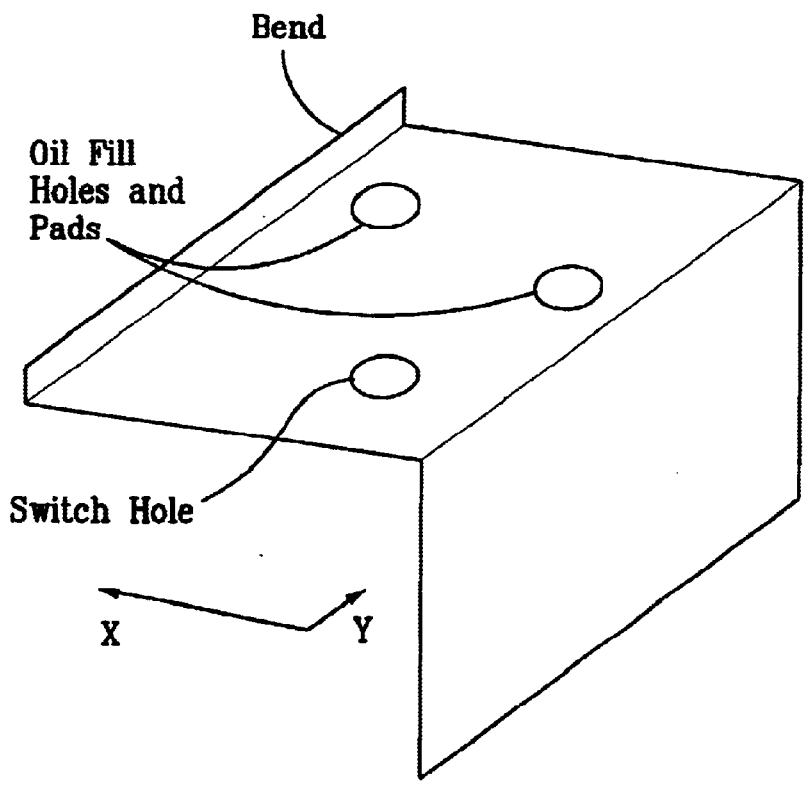
FIG. 3A is a table of a customer's individual desired features for an electrical transformer tank enclosure, according to the present invention.
FIG. 3B is a drawing of a portion of an electrical transformer tank enclosure referred to in FIG. 3A, according to the present invention.

FIGS. 3A and 3B provide a table and corresponding drawing showing one example of a customer's individual desired features. Each of the characteristics shown in FIG. 3B have a corresponding part number, name and location in the table in FIG. 3A. For example, a customer may require a switch hole, located at X1=19 and Y1=4.57 and a bend along the Y-axis at Y1=17.32 and Y2=51.51. The customer also may require of these features has a corresponding part number.

Referring back to FIG. 2, the characteristic data corresponding to the desired electrical transformer tank provided in step 201 then enters design database computer 104 in step 202. If the customer did not know the part number associated with each feature in step 201, step 202 will map the part number to a corresponding desired feature. Specifically, in step 202, design database computer 104 creates a MDF by mapping each desired characteristic (or the desired tank model number) to a database of part numbers and corresponding machine and tool numbers. The identified numbers represent the necessary machines and their tools needed to create the desired characteristics, as represented by part numbers. In other words, each part number has a corresponding list of machines and tools necessary to create the part. In addition, in step 202, if the data entry included individually desired features, design database computer 104 carries forward the specified locations of each of the desired characteristics as designated by data source 102. If the data entry simply specified a tank model number, these locations will be generated automatically.

FIG. 4A provides a sample table indicating the machines and tools needed to perform a desired task. Each part number has a corresponding list of machines and tools necessary to create the desired part (i.e., feature). A tool is a subcomponent of a machine on the manufacturing line. As shown in FIG. 4A, machine M04 and tool T03 may be used to create part number 2A16023F01, which corresponds to the two oil fill holes specified by data source 102. Stated differently, part number 2A16124F01 may require the use of a plasma cutting head tool (e.g., T03) located in laser cutting machine 106 in order to create an oil fill hole. This process is repeated for each individual characteristic until a list of the necessary machines and tools is created as shown, for example, in FIG. 4A. Once the machines and their tools have been selected, a MDF may be created.

FIG. 4B shows an example of a MDF, according to the present invention. As shown in FIG. 4B, the MDF lists the location (e.g., X-Y location) of the desired feature, and the machine and its tool necessary to create the feature. For example, in the first part of the table tool T03 of machine M04 will create two holes. The first hole is located at x=16.90 and y=6.82. The second hole is located at x=16.90 and y=24.74. Then, tool T05 of machine M04 creates another hole at x=19 and y=4.57. Tool T243 of machine M05 then creates a bend along the y axis at x=0, y=17.32 and x=0, y=51.51. Notably, the order of each operation is logically arranged such that one machine may always operate on the electrical transformer tank enclosure before another machine. For example, it may be preferable for hole cutting machine M04 to operate on the electrical transformer tank enclosure before bending machine M05. An exemplary MDF for use with the present invention for the manufacture of an electrical transformer tank is included in FIGS. 5A and 5B.

Referring back to FIG. 2, in step 203, cell control computer 101 parses the MDF into discrete file packets and transfers the packets to master PLC 105, terminal server 103 and laser cutter 106. Each file packet corresponds to a particular robot and machine. Unlike the other robots and machines, cell control computer 101 is coupled directly to laser cutter 106. This is due to the added complexity of laser cutter 106 and consequent volume of information that must be processed by laser cutter 106. In addition, because of the complexity of laser cutter 106, it may include a computer (not shown) that processes the MDF routed by cell control computer 106. The connection between laser cutter 104 and cell control computer 101 may be an RS-422 serial connection, for example.

In step 204, cell control computer 101 sends the parsed MDF for robots A 107, B 109, and C 111 to terminal server 103. Terminal server 103 then sequences the parsed MDF for the operation of robot A 107, robot B 109, and robot C 111 in accordance with the manufacturing line's process. In step 205, cell control computer 101 sends the parsed MDF for machines 106, 108 and 110 to master PLC 105. Master PLC 105 then sequences the parsed MDF for each of machines 106, 108 and 110 in accordance with the manufacturing line's process. For example, as shown FIG. 4B, hole cutting machine M04 and tool T03 will be operated before bending machine M05 and tool T243. In step 206, robots A 107, B 109, and C 111 receive relevant MDF from terminal server 103 in a logical sequence. In step 207, machines 106, 108 and 110 receive the relevant MDF from master PLC 105 in a logical sequence. Each of the machines and the robots receive the MDF into their resident parametric programs.

In step 208, a computer internal to robots 107, 109, and 111 converts the parametric program with the inputted MDF into a format readable by the individual robots, for example CNC programming instructions. In step 209, a computer internal to machines 106, 108 and 110 convert the parametric program with the inputted MDF into a format readable by the individual machines, for example CNC programming instructions. The robots and the machines participate in the manufacturing, as commanded by the CNC programming instructions and to output the final product in step 210. Because the resident parametric program is a shell that integrates the entire functionality of the robots and machines, the parametric program is written for each production line device just once. The inputted MDF is the mechanism that instructs the production line devices to perform differently depending on the particular characteristics of the desired product.

The present invention is directed to a system and method for automating a robotically-controlled production line, that includes, but is not limited to, the production of electrical transformer tank enclosures, regardless of any specific description in the drawing or examples set forth herein. It will be understood that the present invention is not limited to use of any of the particular parts or assemblies discussed herein. Indeed, this invention can be used in any assembly or manufacturing line that requires robotic automation. Further, the system disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A method for automating a laser cutting device, comprising:
   receiving a data file to said laser cutting device;
   converting said data file to an instruction file;
   operating said laser cutting device with said instruction file;
   programming said laser cutting device with a parametric computer program, wherein said parametric computer program receives said data file; and
   automatically connecting a power source to said laser cutting device, when said laser cutting device receives said data file.

2. The method of claim 1, wherein said instruction file is a computer numeric control computer program.

3. The method of claim 1, wherein said data file includes characteristics to be created on a workpiece by said laser cutting device.

4. The method of claim 1, further comprising receiving the data file from a location remote from the laser cutting device.

5. The method of claim 4, wherein the data file is received via the Internet.

6. The method of claim 1, wherein the data file includes individually identified characteristics of a product.

7. The method of claim 1, further comprising sequencing the data files.

8. The method of claim 1, wherein the parametric computer program integrates the functionality of the laser cutting device.

9. An automated laser cutting system, comprising:
   a laser cutter;
   a computer coupled to said laser cutter, wherein said computer is programmed with a parametric computer program;
   one or more data sources coupled to said computer, wherein said computer converts a data file from said data source to an instruction file that operates said laser cutter; and a controller coupled to said computer, said laser cutter and to a power source, wherein said controller automatically connects said power source to said laser cutter when said computer receives said data file.

10. The system of claim 9, wherein said instruction file is a computer numeric control computer program.

11. The system of claim 9, wherein said data file includes characteristics to be created on a workpiece by said laser cutter.

12. The system of claim 9, wherein the data file is received from a location remote from the laser cutting device.

13. The system of claim 12, wherein the data file is received via the Internet.

14. The system of claim 9, wherein the data file includes individually identified characteristics of a product.

15. The system of claim 9, wherein the data files are sequenced by the computer.

16. The system of claim 9, wherein the parametric computer program integrates the functionality of the laser cutter.

17. An automated laser cutting system, comprising a laser cutter, a computer coupled to said laser cutter, and one or more data sources coupled to said computer, a controller coupled to said computer, said laser cutter and to a power source, wherein said controller automatically connects said power source to said laser cutter when said computer receives said data file, wherein said computer is programmed with a parametric computer program, and wherein said computer converts a data file from said data source to a computer numeric control computer program that operates said laser cutter.

* * * * *